3,027,223
CAUSTIC MERCERIZING SOLUTIONS
Arthur S. Teot, Midland, Mich., assignor to The Dow Chemical Company, Midland, Mich., a corporation of Delaware
No Drawing. Filed Dec. 11, 1957, Ser. No. 701,994
1 Claim. (Cl. 8—125)

The present invention relates to caustic solutions and is more particularly concerned with caustic solutions employed in the mercerizing of cotton.

Alkaline mercerizing solutions are generally well known in the trade. The more common solutions consist of an aqueous solution of a strong alkali, such as sodium hydroxide, in concentrations of from 15 to about 30 percent. These solutions are usually employed with wetting assistants to reduce the time required for the alkali to wet the cotton fibers. It is to these types of solutions that the present invention is directed.

It is an object of the present invention to provide a caustic mercerizing composition having improved wetting characteristics. If is a further object of the present invention to provide a composition which with known wetting assistants will provide an improved caustic mercerizing solution. These and other objects will become apparent to those skilled in the art from the following specification and claim.

It has now been found that the addition of a minor amount of an alkylated diphenyloxide sulfonate having an average of from 1 to 1.3 alkyl substituents, each corresponding to an alkyl radical containing from 8 to 18 carbon atoms, and an average of from 1.8 to 3.3 sulfonate radicals per diphenyl oxide nucleus, admixed with a minor amount of a wetting assistant such as the water-immiscible mono and polyhydric alcohols to aqueous caustic solutions produces cotton mercerizing solutions having greatly reduced wetting times. Good results are obtained when the aliphatic diphenyl oxide sulfonate compound is employed in an amount of from 0.05 to 1.0 percent by weight of the caustic solution and the wetting agent is employed in amounts of from 0.01 to 1.0 percent by weight.

The mono and dialkanol wetting assistants employed in the present invention are those which are well known in the art and are water-immiscible; that is, insoluble or only slightly soluble in water, such as, n-butanol, 2-ethylhexanol, nonyl alcohol, ethylene glycol monobutyl ether, n-hexanol, cyclohexanol, decyl alcohol, and the like, and mixtures thereof.

The alkali metal salts of alkylated diphenyl oxide sulfonates which may be employed in the present invention are prepared in the manner described in a copending application Serial No. 623,286, for "Method of Making Alkyl Diphenyl Ether Sulfonates," filed November 20, 1956, by A. F. Steinhauer, now Patent No. 2,854,477, and in U.S.P. 2,081,876, issued to Milton A. Prahl, May 25, 1937.

The following examples illustrate the present invention but are not to be construed as limiting.

*Example 1*

Identical 25 percent sodium hydroxide aqueous solutions one containing a commercial mercerizing wetting composition consisting of a 9 to 1 mixture of cresol-cyclohexanol and the other containing sodium dodecyldiphenyl oxide disulfonate were prepared containing 0.1 percent by weight of the disulfonate compound or cresol-cyclohexanol mixture admixed therewith. The solutions were tested for interfacial tension against a standard of purified mineral oil and the surface tensions measured. The following table reports the results.

|  | Interfacial Tension | Surface Tension |
|---|---|---|
| Commercial standard 9:1 cresol-cyclohexanol | 34.1 | 65.1 |
| Sodium dodecyl diphenyl oxide disulfonate | 13.6 | 42.3 |

*Example 2*

In a similar manner as Example 1 the following compositions were prepared and tested for wetting time using test bundles of cotton yarn.

| Amount in grams of sodium dodecyl diphenyl oxide disulfonate compound in 100 milliliters of aqueous 23 percent NaOH solution (50° Tw) | Wetting Assistant And amount per 100 ml. | | Wetting Time in Sec. |
|---|---|---|---|
| 0.067 | 2-ethylhexanol, grams | 0.06 | 6.8 |
| 0.34 | nonylalcohol, cc | 0.1 | 7.8 |
| 0.34 | do | 0.1 | 3.4 |
| 0.34 | ethylene glycol monobutyl ether, cc | 0.2 |  |
| 0.34 | n-hexanol, cc | 0.1 | 5.8 |
| 0.34 | do | 0.2 | 3.1 |
| 0.125 |  |  | >480 |

*Example 3*

A caustic mercerizing solution was prepared having the following composition:

20 percent aqueous sodium hydroxide _____ cc __ 100
2-methyl-2,4-pentanediol _____ grams __ 0.18
n-Nonyl alcohol _____ do ____ 0.10
Sodium nonyl diphenyl oxide disulfonate ___ do ____ 0.30

A clear solution formed on mixing. One inch bundles of 120 ends of 30/2 carded cotton yarn were dropped gently on the surface of the mercerizing solution and the time recorded for each bundle to become completely wetted. The results of repeated tests are set forth below:

|  | Secs. |
|---|---|
| 1st bundle | 13.2 |
| 2nd bundle | 16.3 |
| 3rd bundle | 13.5 |
| 4th bundle | 13.1 |
| 5th bundle | 12.4 |
| 6th bundle | 11.6 |
| 7th bundle | 10.5 |
| 11th bundle | 11.9 |
| 16th bundle | 11.7 |
| 28th bundle | 16.2 |

*Example 4*

In the manner of Example 3 employing 0.20 gram of n-nonyl alcohol in place of 0.10 gram the following results were obtained:

|  | Secs. |
|---|---|
| 1st bundle | 3.1 |
| 2nd bundle | 4.7 |
| 3rd bundle | 3.9 |
| 4th bundle | 3.5 |
| 7th bundle | 3.9 |
| 12th bundle | 3.6 |
| 19th bundle | 2.5 |
| 26th bundle | 3.0 |
| 30th bundle | 3.5 |

It is to be understood that various sulfonates may be employed as for example, octyl diphenyl oxide disulfonate, pentadecyl diphenyl oxide disulfonate, nonyl diphenyl oxide disulfonate, dodecyl diphenyl oxide disulfonate, hexadecyl diphenyl oxide trisulfonate, octadecyl diphenyl oxide trisulfonate and the like.

I claim:

A wetting composition comprising an alkaline mercerizing solution; as a wetting assistant, a water immiscible alkyl alcohol having from 4 to 12 carbon atoms 6 of which may be joined together to form a cyclic alkyl ring; and, as a wetting agent, an alkylated diphenyl oxide sulfonate having in its molecule an average of from 1.8 to 3.3 sulfonate groups and an average of from 1 to 1.3 alkyl substituents, each of said substituents containing from 8 to 18 carbon atoms.

References Cited in the file of this patent

UNITED STATES PATENTS

| | | |
|---|---|---|
| 1,881,745 | Lindner | Oct. 1, 1932 |
| 2,081,876 | Prahl | May 25, 1937 |
| 2,158,494 | Corteen et al. | May 16, 1939 |
| 2,221,933 | Eitelman et al. | Nov. 19, 1940 |
| 2,854,477 | Steinhauer | Sept. 30, 1958 |

FOREIGN PATENTS

| | | |
|---|---|---|
| 246,507 | Great Britain | June 23, 1927 |
| 279,784 | Great Britain | Dec. 22, 1927 |
| 307,238 | Great Britain | Mar. 7, 1929 |
| 350,018 | Great Britain | June 8, 1931 |
| 734,749 | Great Britain | Aug. 3, 1955 |